Feb. 23, 1937.  W. F. CROWE  2,072,029
AEROPLANE CONSTRUCTION
Filed Feb. 16, 1935

William F. Crowe
INVENTOR

BY Victor J. Evans & Co.
ATTORNEY

Patented Feb. 23, 1937

2,072,029

UNITED STATES PATENT OFFICE 2,072,029

AEROPLANE CONSTRUCTION

William F. Crowe, Los Angeles, Calif.

Application February 16, 1935, Serial No. 6,901

1 Claim. (Cl. 244—13)

The invention relates to an aeroplane construction and more particularly to a hood arrangement for aircraft.

The primary object of the invention is the provision of an aircraft of this character, wherein through the instrumentality of a hood formation therein an increasing lift is obtained of that portion of the atmosphere around the craft passing under or within the hood formation irrespective of whether the passage of the atmosphere under the hood is caused solely by the forward thrust of the craft or forced under the hood at a greater pace by the slip stream from one or more motors placed in front, inside or under such hood formation and such hood formation may be of any design and in association with variable types of aircrafts and additionally the hood formation may be duplicated or arranged related to one or more planes of such aircraft.

Another object of the invention is the provision of an aircraft of this character, wherein through the medium of a hood formation the said craft will be able to make a landing at a much lower speed than without the use of said formation and the latter affords a much greater surface and consequent resistance to air currents passing immediately under it as well as minimizing structural failure of the tail structure of the aircraft due to buffeting as the air passing immediately under or through the hood formation will have a tendency to form into a steady unbroken stream flow playing directly on the tail structure before the flow has a chance to become broken up by eddies and thus resultant in an invisible shock absorber for the tail structure.

A further object of the invention is the provision of an aircraft of this character, wherein by the grouping of motors and connecting the same for the operation of a propeller enables the concentration of power or pull in the center of the craft instead of at each side of the center as is common in present-day large type ships and also reduces the hazard of motor failure because any one of the motors can operate independently of the others and still deliver power to the center of the ship.

A further object of the invention is the provision of an aircraft of this character, wherein the hood arrangement and power concentration at the center of the craft assures maximum flying efficiency, reduces head resistance and improves landing and takeoff qualities.

A further object of the invention is the provision in an aircraft of a multiplicity of motors, grouped to form a single unit of power for the operation of a single propeller shaft, which through suitable clutch and gear arrangement (not shown) may be operated by any one motor in the group, thus reducing the hazard of motor failure.

A still further object of the invention is the provision of an aircraft of this character, which is novel in construction, thoroughly reliable and efficient in its operation, possessing greater load carrying capacity, strong, durable, and can be operated at a less cost per mile in proportion to load carried.

With these and other objects in view, the invention consists in the features of construction, combination and arrangement of parts as will be hereinafter more fully described in detail, illustrated in the accompanying drawing, which discloses the preferred embodiment of the invention and pointed out in the claim hereunto appended.

Figure 1:
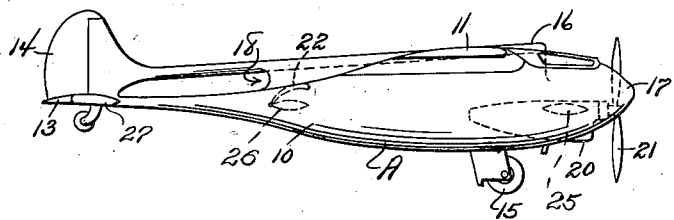
Figure 1 is a side elevation of an aircraft constructed in accordance with the invention.
Figure 2:
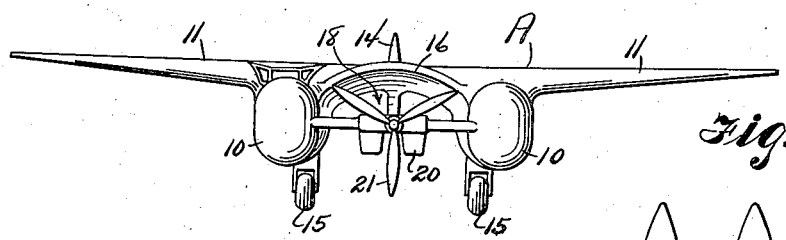
Figure 2 is a front elevation thereof.
Figure 4:
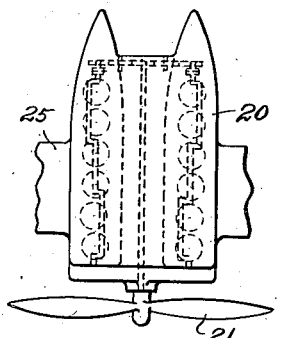
Figure 4 is a fragmentary detailed plan view showing double motor unit drive for the propeller of the craft.
Figure 3:
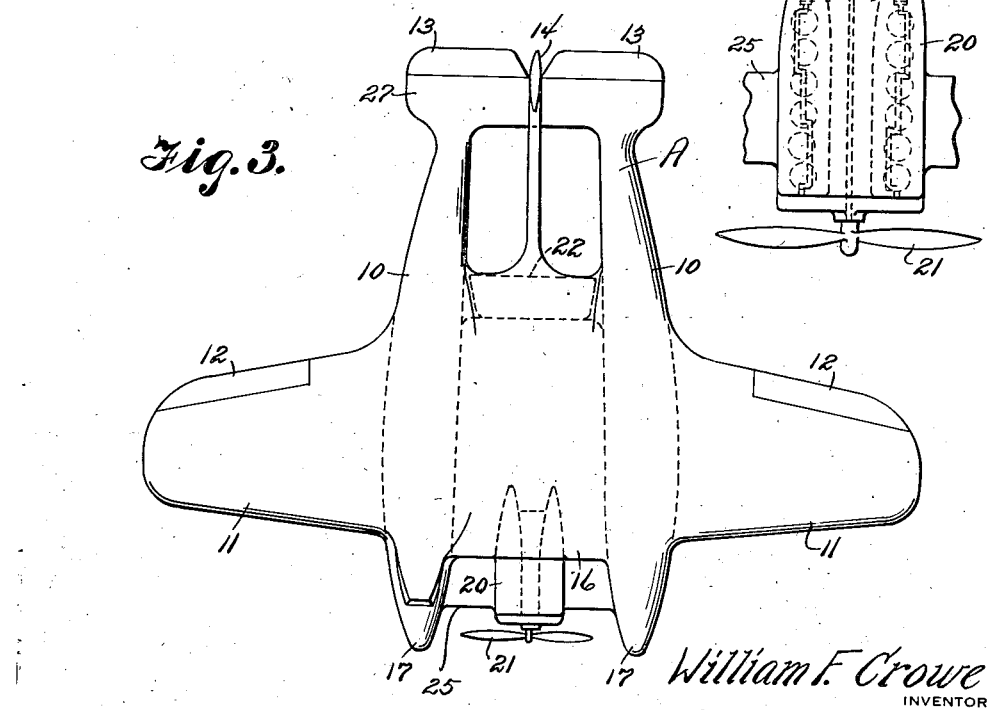
Figure 3 is a top plan view.

Referring to the drawing in detail, A designates generally an aircraft, in this instance of the monoplane type, formed with the pair of spaced stream lined cabins 10 which are arranged beneath the wing or plane 11, it having the ailerons 12 while at the rear of the craft are the elevators 13 and tail rudder 14, respectively, these being controlled in a conventional manner from within one of the cabins 10 constructed for the pilot or operator of the machine. As is usual, there is provided an approved landing gear 15 beneath the cabins 10.

Arranged between the cabins, secured thereto and to the center of the wing or plane 11, there is a hood 16 in this instance it being upwardly arched and extends at its lead end removed rearwardly from the noses 17 of the cabins to a point with the trailing end rearwardly with respect to the heel edge of the plane or wing 11 to provide a stream flow way 18 therebeneath and between the cabins 10, the latter at their inner sides providing the side wall formations to the said hood 16. The way 18 is preferably tapered in a rearward direction.

Arranged at the forward portion of the way 18 and centrally located with respect to the cabins is one or more motors but in this instance a pair of motors 20, these may be arranged side by side or in tandem with driving connections for operating a single propeller 21 its drive being located at the longitudinal center of the aircraft and these motors in tandem, lateral groups or singly function as the power medium for the said propeller 21. The driving connections between the motors 20 and the propeller 21 may be controlled by clutch mechanism (not shown) and regulated from within the pilot's cabin 10, the motors being supported fixed between the cabins in any suitable manner and by the arrangement the power source is concentrated at the center of the craft of the line of draft thereof.

At the rear of the way 18 and suitably supported beneath the hood 16 are speed arresters 22 in the form of a hinged panel or panels which can be adjusted to further reduce the area of the rear opening of air passage way 18 causing the air to bank under the hood for enabling the craft to land at a slower speed.

By the hood arrangement irrespective of the design or type of aircraft having the same or the location of the cabins or the number of power units employed for the craft added buoyancy thereto is obtained, as a straddle of the atmosphere surrounding the ship and immediately under the hood will be had. The forward motion of the craft when the propeller is operating causes the air passing under the hood 16 to slightly compress before escaping at the rear of said hood and the slip stream from the propeller or propellers as used with the craft will aid in the compression and lift and by the resultant expansion of the air caused by its compression under the hood affects the atmospheric pressure to become greater therebeneath than on the top side of such hood with the result that the craft will follow the line of the least resistance which is upwardly with greater lifting efficiency. The hood arrangement under many variations thereof will give to the ship maximum stability or a smooth forward thrust through the air under the influence of the motors operating the propeller or propellers at the fore of such craft. The propeller or propellers serving in the capacity of air pumps will increase the atmospheric pressure under the hood 16 as well as converting a choppy air into a smooth stream of air and with a maximum lift to the craft in flight. The flow stream of air through the way 18 when discharging rearwardly of the hood 16 will have a stead unbroken flow playing directly on the tail end of the craft before such stream has a chance to become broken up by eddies and thus affords an invisible shock absorber for the tail end of the craft and minimizes structural failure at this end of said craft due to buffeting as is common in standard makes of aircraft. The cabins 10 are braced and held in spaced longitudinal alinement by flat plates as disclosed by the drawing. The front spacer plate 25, is secured centrally to the cabins at the nose end of the craft, and forms a support for the motor 20. The intermediate brace plate 26 is located beneath the rear edge of the hood 16, and provides a rest for the free edge of the cross-sectionally arched arrestor 22 (see dotted lines Figure 1), while the rear spacer plate 27, is fixed to the reduced tail ends of the cabins, and provides a support for the mounts for the rear ground wheels as well as a supporting means for the hinged elevators 13 and for the vertical element 28, on the end of a rod 29, which extends from the hood and to which the rudder 14 is hinged.

By arrangement of the power source for the propeller the head resistance of the aircraft is reduced to a minimum and by the hood arrangement a smooth and positive flight of the craft is attained.

The essential features of the invention lie in the hood formation and in concentrating the tremendous driving power of the multiple motor hook-up driving a single larger than ordinary propeller at the center of the aircraft thereby creating a far greater utilization of power and a resultant greater lift.

First, note that the cabins and the under side of the wing are so placed and joined together as to form an air passageway, the forward or leading opening area of which is considerably greater than the rear opening area. Also it is open on its lower side as well.

As the ship is propelled forward, the pressure of that section of the atmosphere, passing through the above described air passageway, is increased because it is passing through a gradually decreasing area which tends to compress it to a considerable degree which is considerably more than the atmospheric pressure on the top side of the wing as the atmosphere on the top side of the wing takes on the form of a partial vacuum, right from the moment the ship starts down the runway. As the ship gathers momentum the partial vacuum increases on the top side of the wing and simultaneously the atmospheric pressure increases in the air passageway and is further increased to a tremendous degree by the slip stream of the propeller entering as a wedge the already partially compressed atmosphere in the air passageway and further expanding and increasing its pressure as the slip stream travels considerably faster than the surrounding atmosphere.

As the pressure is increased on any one side and lessened on the opposite side of a moving body whether it be in water or air that body tends to follow the line of the least resistance, which in this case would be gradually up, thereby increasing the lift and permitting a greater pay load. And at the same time greater ability to land a heavier load more safely by the use of a landing flap or speed retarder to partially close the air passageway at the rear causing the atmosphere to "bank up" in the passageway and act as a partial parachute to aid a landing glide.

The expanding atmospheric wedge lift utilizes the powerful propeller slip stream to aid in developing an additional lift instead of permitting this powerful force to slip by unused resulting in greater utilization of developed power.

What is claimed is:

An aeroplane construction comprising two spaced parallel cabins tapering from their nose to their tail ends, spacer plates between the cabins at the nose and tail ends thereof and intermediate said nose and tail ends, propulsion means supported by the foremost plate, elevators on the rearmost plate, a rudder for the aeroplane at the rearmost plate, a wing over the cabins at the fore end of the aeroplane, a hood to which the wing is centrally secured and having an inner arched wall gradually decreasing in width and depth from the front to the rear end thereof, the rear end of said hood being disposed above the intermediate spacer plate, and a speed arrester pivoted between the cabins and at rest upon said intermediate plate.

WILLIAM F. CROWE.